Patented Aug. 12, 1952

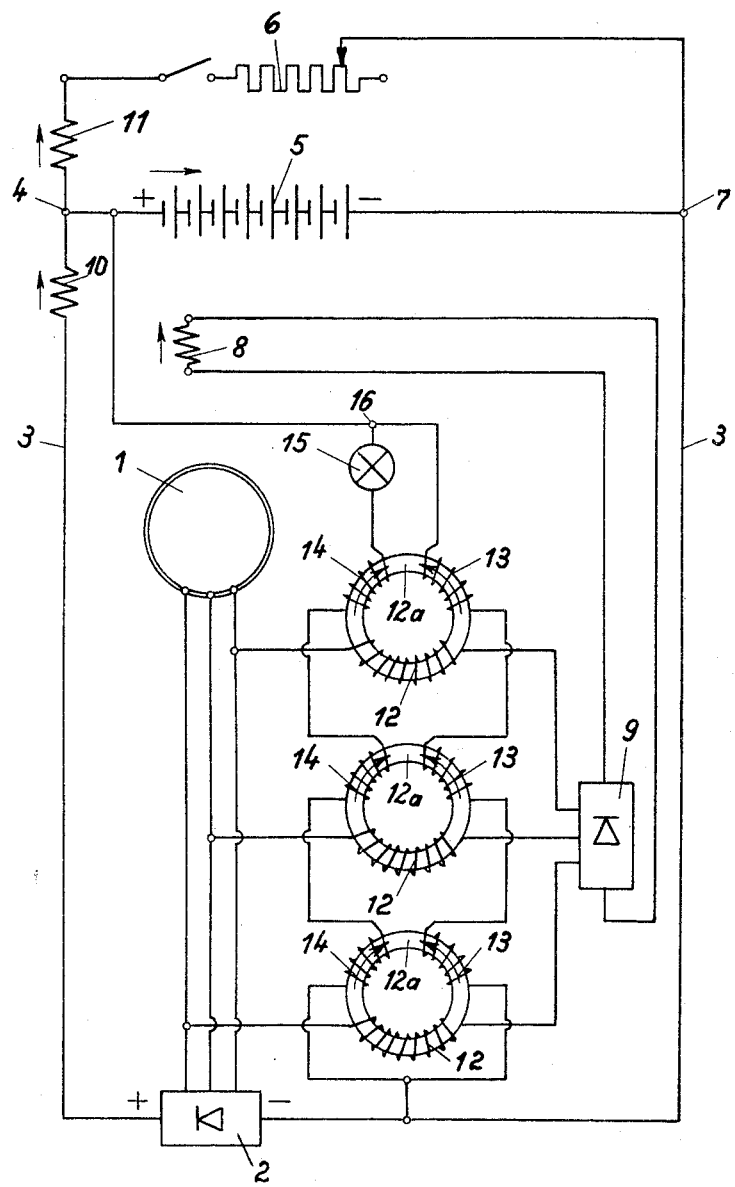

2,607,027

UNITED STATES PATENT OFFICE 2,607,027

ARRANGEMENT FOR CHARGING STORAGE BATTERIES

Ludwig Schön and Theodor Höwer, Essen, Germany, assignors to Fried. Krupp Elektrowerkstatten, Essen, Germany Application February 28, 1951, Serial No. 213,214
In Germany March 6, 1950

6 Claims. (Cl. 320—32)

The present invention relates to an arrangement for charging storage batteries which are fed by a generator of reversible direction of rotation and or of variable speed of rotation. Charging arrangements of this type are required in particular for the lighting systems of vehicles, especially for the lighting systems of trains. However, such charging devices are also otherwise used, for instance, in connection with wind and water turbine installations.

It is an object of the present invention to avoid, as far as possible, control and safety devices which heretofore were indispensable with such charging arrangements, to thereby create a particularly simple and safe installation.

It is another object of this invention to provide an arrangement for charging a storage battery by means of a self-exciting alternating current or three-phase generator of reversible direction of rotation and/or variable speed of rotation, in which variations occurring in the speed of rotation of the charging generator above a predetermined minimum speed, as well as variations occurring in the current value of the current passing through the current consuming arrangement, will for all practical purposes remain without effect upon the charging current.

It is a still further object of this invention to provide a battery charging arrangement of the above mentioned type, in which the charging of the storage battery will automatically be terminated as soon as the battery has been completely charged.

These and other objects and advantages of the invention will appear more clearly from the following specifications in connection with the accompanying drawings which represent a wiring diagram for an arrangement according to the present invention.

General arrangement

According to the present invention there is provided an arrangement for charging a storage battery which is characterized in that the charging current is generated by a self-exciting alternating current generator of reversible direction of rotation and/or variable speed of rotation and is rectified by rectifier means electrically connected to said generator and adapted to supply direct current to a direct current circuit arranged for connection with the battery to be charged. The alternating current generator according to the present invention may be as well a single-phase generator as a polyphase generator, especially a three-phase generator. According to a preferred embodiment of this invention, the exciting winding of the generator is connected to the generator through an additional rectifier, while the generator is preferably provided with two series windings, which are arranged so that the total generator current will pass through one of said series windings, while only the current of the outer load will pass through the other one of said series windings.

The invention furthermore comprises an arrangement which will automatically bring to an end the charging of the battery as soon as the latter has been fully charged. To this end, a choke with direct current premagnetization is arranged between the generator and the exciting rectifier, while the direct current pre-magnetization is effected by two coils respectively excited in opposite direction, said coils being fed by the storage battery and are arranged so that a current of constant value passes through one of said coils, whereas a current proportional to the battery voltage passes through the other coil.

Structural arrangement

Referring to the drawings, the reference numeral 1 designates a three-phase generator delivering current to a rectifier installation 2. This rectifier installation consists of six individual rectifiers (not shown in the drawings), which are arranged according to the well known Grätz diagram. Branching off from the rectifier installation 2, is a direct current circuit 3 which branches at the tap 4 into two conductors. One of these conductors leads to the storage battery 5 to be charged, while the other conductor leads to a current consuming arrangement 6, for instance, a lamp bank. The two conductors reunite at the point 7. The current generator 1 is excited primarily by an exciting winding 8 which is fed by a second rectifier 9 connected to the current generator 1. A second exciting winding 10 of the current generator 1 is provided in the direct current circuit 3 before the tap 4. A third exciting winding 11 is provided behind this point 4 in the feeding conductor leading to the current consuming arrangement 6. In the conductors connecting the three-phase generator 1 with the rectifier 9, there are arranged chokes 12 which will be explained later as to their meaning and which may be considered short-circuited for the following discussion.

It has been found that, from a certain speed of rotation of the generator 1, the current value of the charging current fed into the battery 5 is, for all practical purposes, independent of the variations occurring in the speed of rotation. Hence with lighting systems for trains, provided with generators driven by car axles, the variations of the traveling speed are from a certain speed, without influence upon the current value, so that the battery is fed with an even charging current.

This effect has its explanation in that with an alternating current generator, with increasing speed of rotation, not only the electromotive force but at the same ratio, also the inductive resistance of the generator increases. No control means whatsoever are required for obtaining this effect.

In addition thereto, with the arrangement according to the present invention, it is possible to obtain that the charging current will also be independent from the current value of the current passing through the current consuming arrangement 6. To this end, it is merely necessary to adapt the number of turns $W_K$ and $W_{K1}$ of the exciting windings 10 and 11 respectively to the inductance L of the generator. This is equal by making L equal to $K_1 \times (W_K + W_{K1})$, $K_1$ representing a constant factor. Since, therefore, the charging current is independent from the variations in the load of the current consuming device, the charging of the battery is effected at unchanged high current value, even if, at the same time current is used, for instance, by the lighting system of the train. In this way it is obtained that the battery after furnishing current, is always recharged in the fastest way possible, so that after a short while, it is again ready to furnish current for a longer period of stoppage of the train.

The invention also furnishes in a very simple manner means for preventing that after compleated charging of the battery, the battery is further fed with a charging current which would unnecessarily heat up the battery liquid and evaporate the same, thereby possibly damaging the battery.

To this end, the invention makes use of the fact that the battery voltage at the end of he charging process, for instance, with lead storage batteries, has increased to a value of about 1.35 times the starting value. More specifically, the above-mentioned chokes 12 are provided in the three conductors connecting the three-phase generator 1 with the rectifier 9. Each of the chokes 12 is mounted on an annular magnetic core 12a which is premagnetized by two direct current coils 13, 14 mounted on the core 12a. These coils 13 and 14 are arranged parallel to the battery 5 in such a manner that the magnetic fields produced by these coils are directed opposite from each other. The current of the coils 13 changes in proportion with the voltage of the battery. In the conductor leading to the coils 14, however, there is arranged an iron hydrogen resistance 15, which in well known manner, maintains the current, passing through these coils, constant independently of variations in the battery voltage. With each pair of coils 13 and 14 belonging to one choke 12, the numbers of turns of the two coils 13, 14 are adapted relative to each other in such a manner that with charged battery, in other words, when the battery voltage is at a maximum and the current passing through the coil 13 has its highest value, the magnetic fields produced by the two coils 13 and 14, will just cancel each other out. Since, however, at the start of the charging process, the current passing through the coils 13 is lower in conformity with the decreased battery voltage, the magnetic field produced by this current in each of the coils 13 is smaller than the oppositely directed magnetic field emanating from the corresponding coil 14, which last-mentioned magnetic field remains high due to the non-changing current passing through the coils 14. The excess of this last-mentioned magnetic field above the field produced by the coil 13, brings about a premagnetization of the corresponding magnetic core 12a which is also surrounded by one of the chokes 12. Each magnetic core 12a is therefore magnetically saturated. Consequently, the chokes 12 have no inductance as far as the alternating current passing therethrough is concerned, so that the chokes 12 do not represent an inductive resistance, and therefor full current value prevails in the rectifier 9, and thus also in the exciting winding 8. This condition remains for the greater period of the charging process, when, with the proceedings charging of the battery, the battery voltage, and therefore also the current value of the current passing through coils 13 increases, and as a result thereof, the excess of the ampere turns of each coil 14 with regard to the ampere turns of the corresponding coil 13, decreases. For, in spite of this decrease, the saturation of the magnetic cores remains due to the characteristic of the saturation graph. Only towards the end of the charging process for the battery, the saturation of the magnetic core decreases rapidly, and when the battery has been completely charged, the premagnetization disappears completely because at that time, as mentioned above, the two magnetic fields emanating from the coils 13 and 14 cancel each other out completely. Now, the total inductance of the chokes 12 through which the alternating current passes, becomes effective. These chokes then cause such a great inductive resistance that the current passing therethrough and therefore also the current passing through the exciting winding 8, disappears for all practical purposes. Consequently, the charging current produced by the generator disappears. Therefore, when the charging of the battery has been completed, a further supply of current to the battery and therefore a possible damage to the battery is automatically avoided. The disappearance of the charging current is effected independently of the variations in the speed of rotation of the generator. This is due to the fact that with increasing speed of rotation, not only the electromotive force of the generator increases which is decisive for the creation of the excited current, but simultaneously also, the inductive effect of the chokes 12 increases with the frequency of the current which is proportional to the speed of rotation. These two effects cancel each other out, so that an increase or decrease of the speed of rotation is without influence upon the exciting current. In other words, the above-referred to disappearance of the exciting current and thus of the charging current is not influenced by the speed of rotation.

In order to avoid that in the direct current coils 13 and 14, alternating currents are induced by the chokes 12, the six direct current coils associated with the three chokes are preferably arranged so (in open delta-delta connection) that their alternating current components cancel each other out. If this is done, an additional choke for suppressing the alternating current components will be superfluous. Therefore, the direct current coil sets 13 and 14 respectively associated with the chokes 12 are so disposed that the coils 13 are arranged in series and, similarly the coils 14 are arranged in series. Both groups of coils are connected to the battery 5 in parallel arrangement. The conductor coming from the plus-pole of the battery branches at the tap 16 into two branches leading to the coils 13 and 14 respectively. The branch conductor leading to the coils 14 comprises the iron hydrogen resistance 15 which maintains the current passing through these coils constant. The arrangement is such that the current passes through the coils 13 in a direction opposite to the direction in which the current passes through the coils 14, the last coils 14 and 13 are connected via conductor 3 with the minus-pole of the battery.

The arrangement according to the invention therefore provides a charging arrangement which is self-governing and which eliminates the harmful effects caused by variations in the speed of rotation. The advantage obtained by this invention is materialized by extremely simple means, especially without the use of any movable switch means and without relays. Furthermore, the rectifier arrangement 2 prevents that the battery 5 discharges via the generator 1, since the rectifier arrangement prevents a current flow through the circuit 3 in the direction from the plus towards the minus pole of the battery 5. Any additional safety device as heretofore required for preventing an undesired discharging of the battery via the current generator, becomes superfluous with the charging arrangement according to the present invention. Since the voltage on the direct current side of the three-phase current rectifier is independent of the phase sequence, a change in the direction of rotation has no influence upon the working of the charging arrangement.

It is, of course, understood that the present invention is, by no means, limited to the particular arrangements shown in the drawings but also comprises any modifications within the scope of the appended drawings.

What we claim is:

1. In an arrangement for charging a storage battery, a self-exciting alternating current generator, circuit means connected to said generator, two series windings arranged in said circuit means for said generator, said series windings being arranged so that the total generator current passes through one of said series windings while only the current of the outer load passes through the other one of said series windings, and rectifier means electrically connected with said generator and arranged within said circuit means, said circuit means being adapted for connection with a storage battery to be charged.

2. In an arrangement for charging a storage battery, a self-exciting alternating current generator, exciting winding means for said generator, first rectifier means interconnecting said winding means with said generator, choke means with direct current premagnetization electrically connected to and arranged between said generator and said rectifier means, second rectifier means electrically connected to said generator, and conductor means connected to said second rectifier means and arranged for connection with a storage battery to be charged.

3. In an arrangement for charging a storage battery, a self-exciting alternating current generator, exciting winding means for said generator, first rectifier means interconnecting said winding means and said generator, choke means connected to and arranged between said generator and said rectifier means and comprising a core, two coils associated with said choke means and arranged so as to be excited in opposite direction by direct current from the battery to be charged for creating magnetomotive forces in said core, means electrically connected with one of said coils to allow only a current of constant value to pass therethrough while permitting the passage of current from the battery to be charged through the other coil at a current value proportional to the battery voltage, second rectifier means electrically connected to said generator, and conductor means connected to said second rectifier means and arranged for connection with the storage battery to be charged.

4. In an arrangement for charging a storage battery, a self-exciting alternating current generator, exciting winding means for said generator, first rectifier means interconnecting said winding means with said generator, choke means connected to and arranged between said generator and said rectifier means and comprising a core, two coils associated with said choke means and arranged so as to be excited in opposite direction by direct current from the battery to be charged for creating magnetomotive forces in said core, means electrically connected with one of said coils to allow only a current of constant value to pass therethrough while permitting the passage of current from the battery to be charged through the other coil at a current value proportional to the battery voltage, said coils being selected so that the magnetomotive forces produced by the direct current ampere turns of the respective coils in said core cancel each other out at a predetermined value of the voltage of the battery to be charged.

5. In an arrangement for charging a storage battery, a self-exciting three-phase alternating current generator, first rectifier means connected to said generator, first direct current circuit means connected to said rectifier and containing the storage battery to be charged, second rectifier means, conductor means interconnecting said second rectifier means and said generator, a plurality of choke means provided with a core and respectively arranged in said conductor means, second circuit means arranged parallel to said first circuit means and adapted to be supplied with current from said storage battery, a plurality of pairs of premagnetizing coils arranged in said second circuit means and respectively associated with said choke means for producing magnetomotive forces in said cores, means associated with one coil of each pair to allow only passage of current of a constant value therethrough, said premagnetizing coils being arranged in open delta-delta connection so as to cause alternating current components to cancel each other out, said coils being furthermore so dimensioned that at a predetermined value of the voltage of said storage battery the magnetomotive forces produced by each coil pair in the choke core pertaining thereto cancel each other out.

6. In an arrangement for charging a storage battery, a self-exciting three-phase alternating current generator, first rectifier means connected to said generator for rectifying the current to be used for charging the storage battery, first conductor means leading from said rectifier means to the battery to be charged, second rectifier means connected to said generator, three chokes each provided with a core respectively mounted in the connection between said second rectifier means and said generator, circuit means connected to said second rectifier means and separate from said conductor means, exciting winding means for said generator arranged in said circuit means, second conductor means arranged parallel to said first conductor means and comprising three pairs of coils respectively associated with said three chokes for producing a magnetomotive force in the cores of the respective chokes, said coils forming two groups with each group consisting of three serially arranged coils respectively pertaining to each pair of coils, resistance means associated with one of said groups to thereby permit only a current of constant value to pass through said last-mentioned group while allowing a current of varying value to pass from the battery to be charged through the other group, said groups being arranged so that current from the battery to be charged passes therethrough in opposite direction with regard to each other, the turns of the coils being selected so that the magnetomotive forces produced by the ampere turns of the respective coil pairs in the core of the choke pertaining thereto cancel each other out at a predetermined value of the voltage of the battery to be charged.

LUDWIG SCHÖN.
THEODOR HÖWER.

REFERENCES CITED

The following references are of record in the file of this patent:

UNITED STATES PATENTS

| Number | Name | Date |
|---|---|---|
| 1,344,689 | Haas | June 29, 1920 |
| 1,442,050 | Creveling | Jan. 16, 1923 |
| 1,481,184 | Buchenberg | Jan. 15, 1924 |
| 1,807,331 | Wright | May 26, 1931 |
| 1,876,548 | Atherton | Sept. 13, 1932 |
| 2,117,019 | Conrad | May 10, 1938 |
| 2,179,299 | Murcek | Nov. 7, 1939 |
| 2,306,998 | Claesson | Dec. 29, 1942 |
| 2,333,617 | Smith | Nov. 2, 1943 |
| 2,373,383 | Christopher | Apr. 10, 1945 |
| 2,421,645 | Partington | June 3, 1947 |
| 2,431,312 | Cronvall | Nov. 25, 1947 |
| 2,519,650 | Hamilton | Aug. 22, 1950 |
| 2,523,472 | Leathers | Sept. 26, 1950 |
| 2,558,644 | Claytor | June 26, 1951 |
| 2,563,670 | Albrand | Aug. 7, 1951 |

FOREIGN PATENTS

| Number | Country | Date |
|---|---|---|
| 24,958 | Australia | Oct. 23, 1935 |
| 441,272 | Great Britain | Jan. 13, 1936 |